J. S. EHRICH.
PROTECTOR FOR AUTOMOBILE TIRES.
APPLICATION FILED DEC. 3, 1908.
965,698.
Patented July 26, 1910.
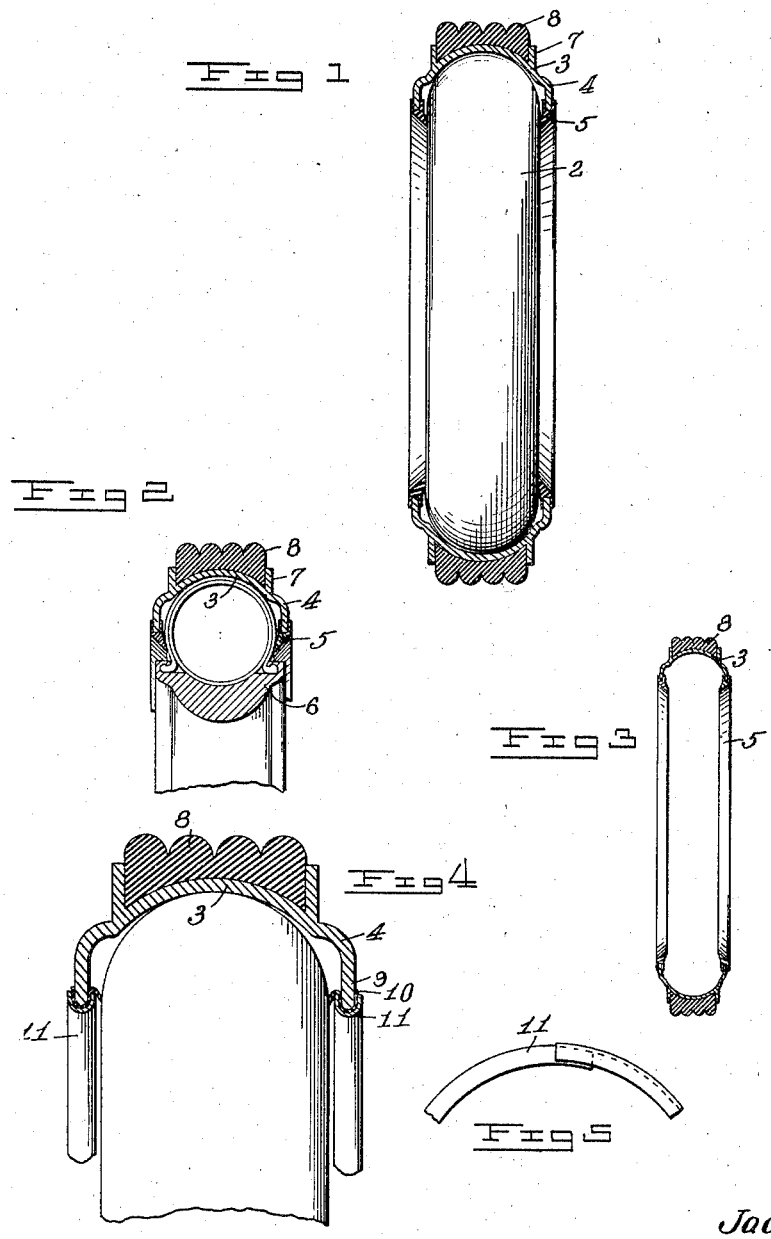
Inventor
Jacob S. Ehrich

UNITED STATES PATENT OFFICE.

JACOB S. EHRICH, OF LYNCHBURG, VIRGINIA.

PROTECTOR FOR AUTOMOBILE-TIRES.

965,698.  Specification of Letters Patent.  Patented July 26, 1910.

Application filed December 3, 1908. Serial No. 465,870.

*To all whom it may concern:*

Be it known that I, JACOB S. EHRICH, a citizen of the United States, residing at Lynchburg, in the county of Campbell and State of Virginia, have invented new and useful Improvements in Protectors for Automobile-Tires, of which the following is a specification.

The present invention relates to protectors for tires, particularly the pneumatic tire commonly used on automobiles, and has for its object to provide an armor which may be readily placed upon the tire, or displaced therefrom, which will be retained in position upon the tire when inflated without the necessity of extraneous holding devices, which will protect the tire from attacks of dust, water and the like, and which, while protecting the tire against puncture, will not detract from its resiliency, and furthermore, the improved armor which I have devised is of such character that a good tread or gripping surface which will prevent skidding of the machine is provided.

In order that the invention may be clear to those skilled in the art, I have illustrated in the accompanying drawing, one embodiment of the invention, and in said drawing:

Figure 1 is a view of a wheel having a pneumatic tire provided with my improved armor which is shown in section. Fig. 2 is a sectional view to show the relation of the armor and the tire. Fig. 3 is a sectional view of the armor removed from the tire. Fig. 4 is a sectional view to show a slightly different form of gripping and sealing means. Fig. 5 is a detail view showing a portion of the gripping rings shown in Fig. 4.

Referring to the drawing by numerals, like numbers indicating like parts in the several views, 2 denotes the tire which may be of any suitable or preferred form, the form shown being of the "clencher" type, as indicated in Fig. 2.

The protector with which the tire is equipped comprises a continuous band or ring 3 of rigid material, preferably metal, which is curved so as to conform generally to the cross-sectional contour of the tire, the said band 3 being provided at each side with bulged out portions 4 to form a chamber into which the tire may expand under compression in order that the resiliency of the tire may not be interfered with, it being obvious that unless this provision for expansion was made the pneumatic tire would be so closely confined and gripped that its resiliency in use would be seriously interfered with.

In order that dirt, water and the like may be prevented from creeping in between the band 3 and the tire 2, I provide the depending wings of the band 3 with elastic members 5, preferably rubber, which wings are in the form of endless bands or hoops, so made and mounted as to hug the tire 2 closely, as best shown in Fig. 2. These wings 5 extending to within a short distance of the rim 6 of the wheel, and being in continuous and gripping engagement with the tire surface so as to make a sealed joint between the tire 2 and the protector 3, and effectually guard against the creeping of dirt, or water in between the tire and the protector. The elastic wings 5 also protect the tire from unnecessary wear on its sides, a result which would follow were the uncovered metal wings of the protector to contact with the sides and rub thereon as the parts rotate.

The protector 3 is preferably provided on its upper face with a pocket or recess formed by projecting wings 7, in which pocket is mounted a single tire of a series of rubber tires 8, preferably of the conical form shown, so as to give a corrugated tread surface which will effectually prevent side slipping or skidding, and will form a good tread surface for the wheel.

The protector can be readily placed upon the ordinary tire by simply deflating the tire, placing the protector in position about the wheel and then inflating the tire which will expand into the protector, filling and engaging it and holding it firmly in position without the necessity of extraneous fastening means, for it will be observed that the elastic gripping wings 5 engage the tire on either side at points below the center thereof and danger of lateral displacement of the protector by reason of side thrusts, is eliminated.

It will be seen that with this form of protector all of the resiliency of the tire is preserved, for the protector being supported entirely by the tire and not being connected with the rigid rim of the wheel is free to move as the tire yields and furthermore, the bulging portions 4 of the protector provide for expansion of the tire under compression, and additionally, the elastic gripping wings will permit expansion of the tire so that no confinement of the tire due to the gripping action of the protector can possibly occur, and all desirable springiness is preserved.

Instead of gripping and sealing members 5 heretofore described, I may use the construction shown in Figs. 4 and 5 in which the protector wings 9 are preferably shaped as shown, and against the inner peripheries of these depending wings 9, I place elastic rings or hoops 10 of rubber, these sealing and gripping wings being held in place by means of spring rings 11, which are expanded against the rubber rings or strips 10 pinching them against the depending wings 9 of the protector and jamming them closely against the tire, as clearly shown in Fig. 4, so as to have the same gripping and sealing action that is secured by the use of the members 5 shown in the other views.

While I have shown and described a particular construction in disclosing my invention, it will be understood that I do not limit myself to the mere details of construction, for obviously the construction may be somewhat varied within the range of mechanical skill and yet be within the scope of my invention.

I claim:

1. A tire protector comprising a metal ring, substantially semi-circular in cross-section, carried and supported entirely by the tire and in contact with the tread thereof, and a ring of resilient material, U-shaped in cross-section, fitted over each edge of said metal ring and provided with a resilient strip adapted to bear against the side of the tire.

2. A tire protector comprising a metal ring, substantially semi-circular in cross-section, adapted to inclose and protect the tread surface of the tire, and a flexible U-shaped ring secured on each edge of the tire protector and provided with a flexible integral strip adapted to bear at all times against the side of the tire.

3. A tire protector comprising a metal ring, substantially semi-circular in cross-section, to inclose and bear against the tread of the tire, and elastic gripping rings U-shaped in cross-section attached to the ends of the tire protector and provided with lateral strips adapted to bear against the side of the tire, and metal rings of similar shape secured over said elastic rings for retaining the latter in place on the edges of the tire protector.

4. A tire protector comprising a metal ring, substantially semi-circular in cross-section, to inclose and bear against the tread of the tire, and elastic gripping rings U-shaped in cross-section attached to the ends of the tire protector and provided with lateral strips adapted to bear against the edge of the tire, and divided spring metal holding rings for retaining the elastic gripping rings on the edges of the metal protector.

5. A tire protector comprising a stiff non-resilient ring curved in cross-section, carried and supported by said tire and in contact with the tread portion thereof, and a ring of resilient material fitted over each edge of said stiff ring and bearing against the adjacent side of the tire.

In testimony whereof I have hereunto set my hand in presence of two subscribing witnesses.

JACOB S. EHRICH.

Witnesses:
A. V. CUSHMAN,
ARTHUR L. BRYANT.